US008488616B2

(12) United States Patent
Wijnands et al.

(10) Patent No.: US 8,488,616 B2
(45) Date of Patent: Jul. 16, 2013

(54) BUILDING MULTIPOINT-TO-MULTIPOINT LABEL SWITCH PATHS

(75) Inventors: Ijsbrand Wijnands, Leuven (BE); Arjen Beers, Calafell (ES)

(73) Assignee: Cisco Technology, Inc., San Jose, CA (US)

( * ) Notice: Subject to any disclaimer, the term of this patent is extended or adjusted under 35 U.S.C. 154(b) by 1110 days.

(21) Appl. No.: 11/204,837

(22) Filed: Aug. 16, 2005

(65) Prior Publication Data
US 2006/0221867 A1    Oct. 5, 2006

Related U.S. Application Data

(60) Provisional application No. 60/668,320, filed on Apr. 5, 2005.

(51) Int. Cl.
*H04L 12/28*    (2006.01)

(52) U.S. Cl.
USPC ....................................... 370/395.5

(58) Field of Classification Search
USPC ................ 370/418, 395.5, 255, 256, 257
See application file for complete search history.

(56) References Cited

U.S. PATENT DOCUMENTS

| | | | | |
|---|---|---|---|---|
| 6,895,008 B2 * | 5/2005 | Enoki et al. | ................ | 370/392 |
| 7,039,687 B1 * | 5/2006 | Jamieson et al. | ............ | 709/220 |
| 7,061,921 B1 * | 6/2006 | Sheth | .................. | 370/395.52 |
| 7,133,403 B1 * | 11/2006 | Mo et al. | ................ | 370/390 |
| 2006/0193332 A1 * | 8/2006 | Qian et al. | ................ | 370/397 |

FOREIGN PATENT DOCUMENTS

| | | |
|---|---|---|
| DE | 10246109 A1 | 4/2004 |
| WO | WO 00/76126 A2 | 12/2000 |

OTHER PUBLICATIONS

International Search Report as mailed from the PCT on Jul. 10, 2006, for counterpart WO Application (PCT/US06/11608; Filed Mar. 29, 2006), 4 pages.
Le Roux et al., Network Working Group, "Requirements for Multipoint Extensions to the Label Distribution Protocol," draft-leroux-mpls-mp-ldp-repw-00.txt, Jul. 2005, pp. 1-15.
Minei et al., "Label Distribution Protocol Extensions for Point-to-Multipoint Label Switched Paths," draft-minei-mpls-ldp-p2mp-01, Jul. 17, 2005, pp. 1-15.
Wijnands, et al., Network Working Group-Internet Draft, "Multicast Extensions for LDP", (Expiration Date: Sep. 2005, draft-wijnands-mpls-ldp-mcast-ext-00.txt); Mar. 2005, pp. 1-12.
Handley, et al., Internet Engineering Task Force—Internet Draft, "Bi-directional Protocol Independent Multicast (BIDIR-PIM)", (Expiration Date: Jan. 2005, draft-ietf-pim-bidir-07.txt); Jul. 2004, pp. 1-45.
Internetworking Technologies Handbook—Fourth Edition, Cisco Systems, Inc., Chapter 32, "MPLS", Copyright © 2004 Cisco Systems, Inc., pp. 523-538.
Internetworking Technologies Handbook—Fourth Edition, Cisco Systems, Inc., Chapter 45, "Internet Protocol Multicast", Copyright © 2004 Cisco Systems, Inc., pp. 699-718.

\* cited by examiner

*Primary Examiner* — Mark Rinehart
*Assistant Examiner* — Mohammad Anwar
(74) *Attorney, Agent, or Firm* — Campbell Stephenson LLP (57) ABSTRACT

Creating, maintaining, and using multipoint-to-multipoint label switch paths (LSP) in a provider network using a protocol such as multiprotocol label switching (MPLS) are presented. A multipoint-to-multipoint LSP, allowing bi-directional multicast-type transmission between routers in a core provider network, is provided, in part, by configuring routers within the core network to associate not only an upstream data interface with an upstream label, but also each downstream interface with an upstream label in an upstream state.

19 Claims, 7 Drawing Sheets

BUILDING MULTIPOINT-TO-MULTIPOINT LABEL SWITCH PATHS

This application claims the benefit, under 35 U.S.C. §119 (e), of U.S. Provisional Application No. 60/668,320, filed Apr. 5, 2005, entitled "Multipoint Labeling." The above-referenced application is hereby incorporated by reference herein in its entirety.

FIELD OF THE INVENTION

This invention relates to the field of information networks, and more particularly relates to building multipoint-to-multipoint label switch paths across the core of a multiprotocol label switching network.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase.

As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's network to provide connectivity between the disparate geographic sites of the business. In order for the business' network to seamlessly function through the provider network, the provider network must be able to provide a medium for transmission of all the business' various types of datastreams, including multicast transmission.

Multicast routing protocols enable multicast transmission (i.e., one-to-many connections and many-to-many connections) by replicating a multicast network packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether one or more downstream subscribers to the multicast packet (i.e., members of the multicast group) are connected to the network node (either directly or indirectly). The network node can then replicate the multicast packet as needed and transmit the replicated packets to any connected subscribers.

Figure 1A:
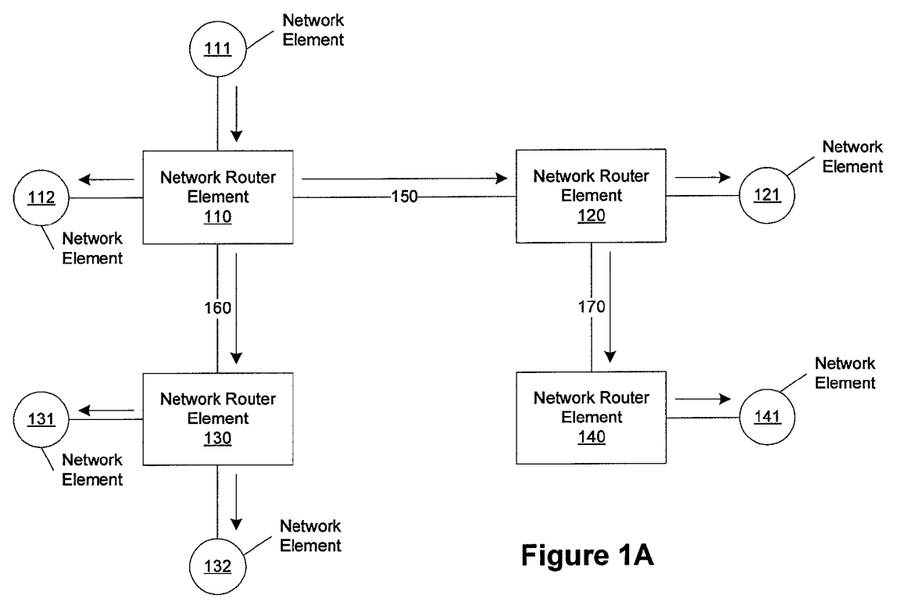
FIG. 1A is a simplified block diagram of a network performing a multicast transmission.

FIG. 1A is a simplified block diagram of a network performing a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes network elements 112, 121, 131, 132 and 141. A multicast datastream having a group destination address to which the above network elements have subscribed as receiver members is transmitted from network element 111 to network router element 110 (illustrated by the arrow from 111 to 110). Network router element 110 determines where to forward packets in the multicast datastream by referring to an internal address table that identifies each port of network router element 110 that is coupled, directly or indirectly, to a subscribing member of the multicast group. Network router element 110 then replicates packets of the multicast datastream and then transmits the packets from the identified ports to network element 112, network router element 120 and network router element 130.

Network router elements 120 and 130 can inform network router element 110 that they are coupled to a subscribing member of a multicast datastream using, for example, a protocol independent multicast (PIM) multicast message. Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a membership report request through a software protocol such as internet group management protocol (IGMP). When a network element wishes to subscribe to a multicast transmission, a special IGMP protocol frame can be transmitted as a multicast "JOIN" request. An IGMP-enabled network router element (or a L2 network device) can have "snooping" software executing to read such a frame and build a corresponding entry in a multicast group address table.

Upon receipt by network router elements 120 and 130, packets from the multicast datastream will be replicated as needed by those network router elements to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

Figure 1B:
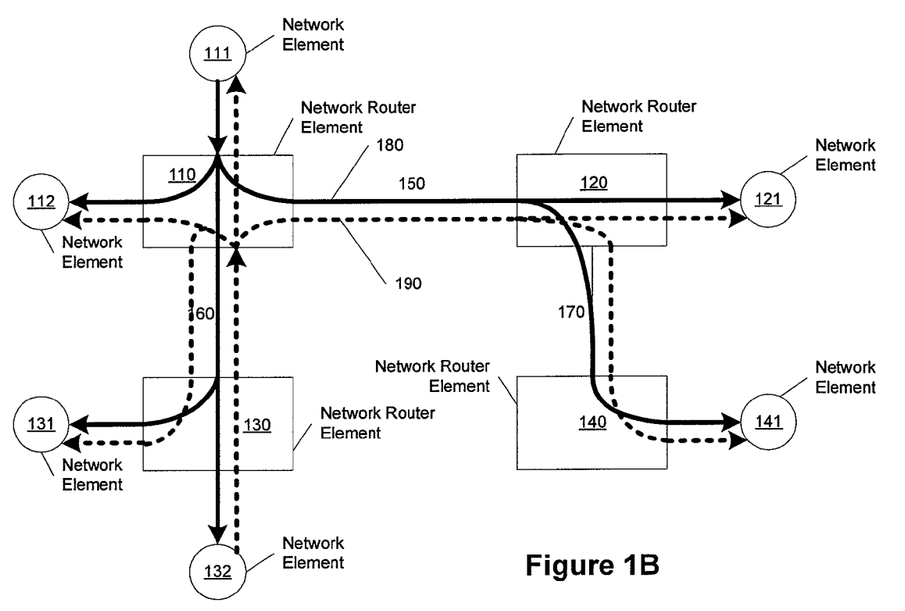
FIG. 1B is a simplified block diagram of a network in which multiple sources are transmitting to a single multicast group.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In such bi-directional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through such a rendezvous point, establishes a loop-free tree topology with a root at the rendezvous point.

FIGS. 1A and 1B illustrate transmission of multicast datastreams in a network in which the network router elements 110, 120, 130 and 140 are directly coupled with one another. But, as stated above, as a business and its network grow, a business' network can become geographically diverse, and therefore the path over which the datastream must flow can include an intervening third-party provider network.

Figure 2:
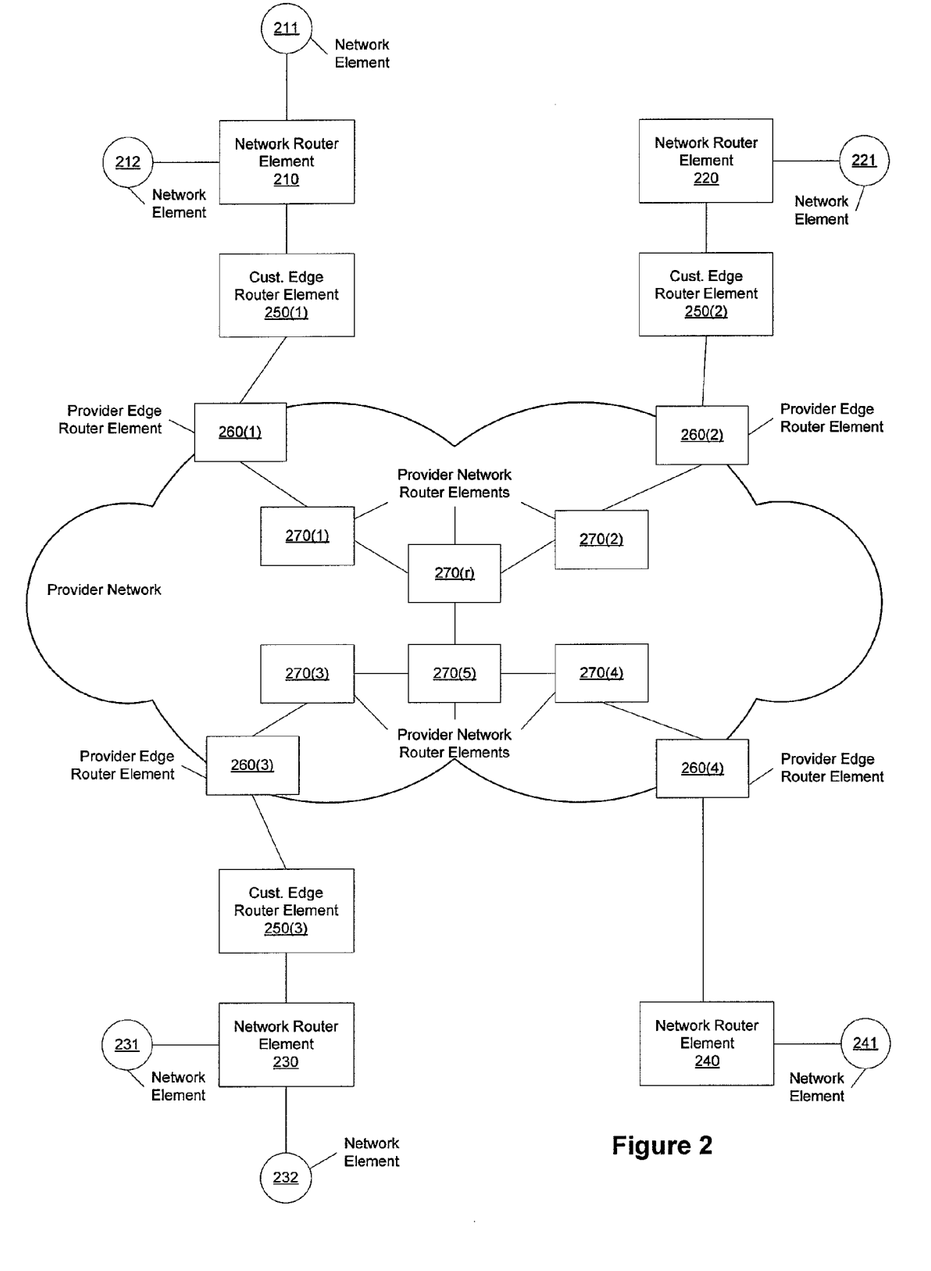
FIG. 2 is a simplified block diagram illustrating a network configuration in which geographically diverse subnets of a business' network are coupled through a third-party provider network.

FIG. 2 is a simplified block diagram illustrating a network configuration in which geographically diverse subnets of a business' network are coupled through a third-party provider network. The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the providers' network, a network router element on the edge of the business' network (a customer edge router) is coupled to a network router element on the edge of the provider's network (a provider edge router). In FIG. 2, customer edge router elements 250(1-3) are coupled to provider edge router elements 260(1-3), respectively. Network router element 240 is coupled to provider edge router element 260(4) (that is, network router element 240 is configured as a customer edge router).

It should be noted that the customer edge router and the provider edge router functionality can be provided by a single router. Further, a network router element such as 240 can also serve as an edge router. The provider edge routers provide access to the provider's network which can contain data transmission lines, network router elements, and OSI Level 2 network devices to aid in the transmission of data from one provider edge router to another provider edge router. The provider network illustrated in FIG. 2 contains, as an example, network router elements 270(1-5) and 270(r), which are coupled in a manner to permit transmission of packets through the provider network. A provider network is not limited to such a configuration, and can include any number of network router elements, transmission lines, and other L2 and L3 network devices.

In order to facilitate transmission of data through the provider network, the provider network can utilize different protocols from those used in coupled customer networks. Such provider network protocols can permit faster data transmission and routing through the network. Any needed translation between customer and provider network protocols can be performed by the edge routers. One such routing protocol that can be used by a provider network is multiprotocol label switching (MPLS).

In a typical router-based network, OSI Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OSI Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. In light of this dual nature, MPLS routers are called label switch routers (LSRs).

In an MPLS network, incoming datastream packets are assigned a label by an edge label switch router (e.g, provider edge router element 260(1)). An edge LSR has one or more network interfaces connected to other LSRs within the provider network and one or more other network interfaces connected to non-MPLS enabled devices (e.g., a customer edge router). The label takes the form of a header created by the edge LSR and used by LSRs within the provider network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). The path defined by the labels through core LSRs between a pair of edge LSRs is called a label switch path (LSP). Label information is distributed among the LSRs through the use of a label distribution protocol (LDP). Packets are forwarded within the core network along the label switch path where each LSR makes forwarding decisions based solely on the contents of the label. At each hop, an LSR may strip off the existing label and apply a new label which tells the next hop how to forward the packet.

Figure 3:
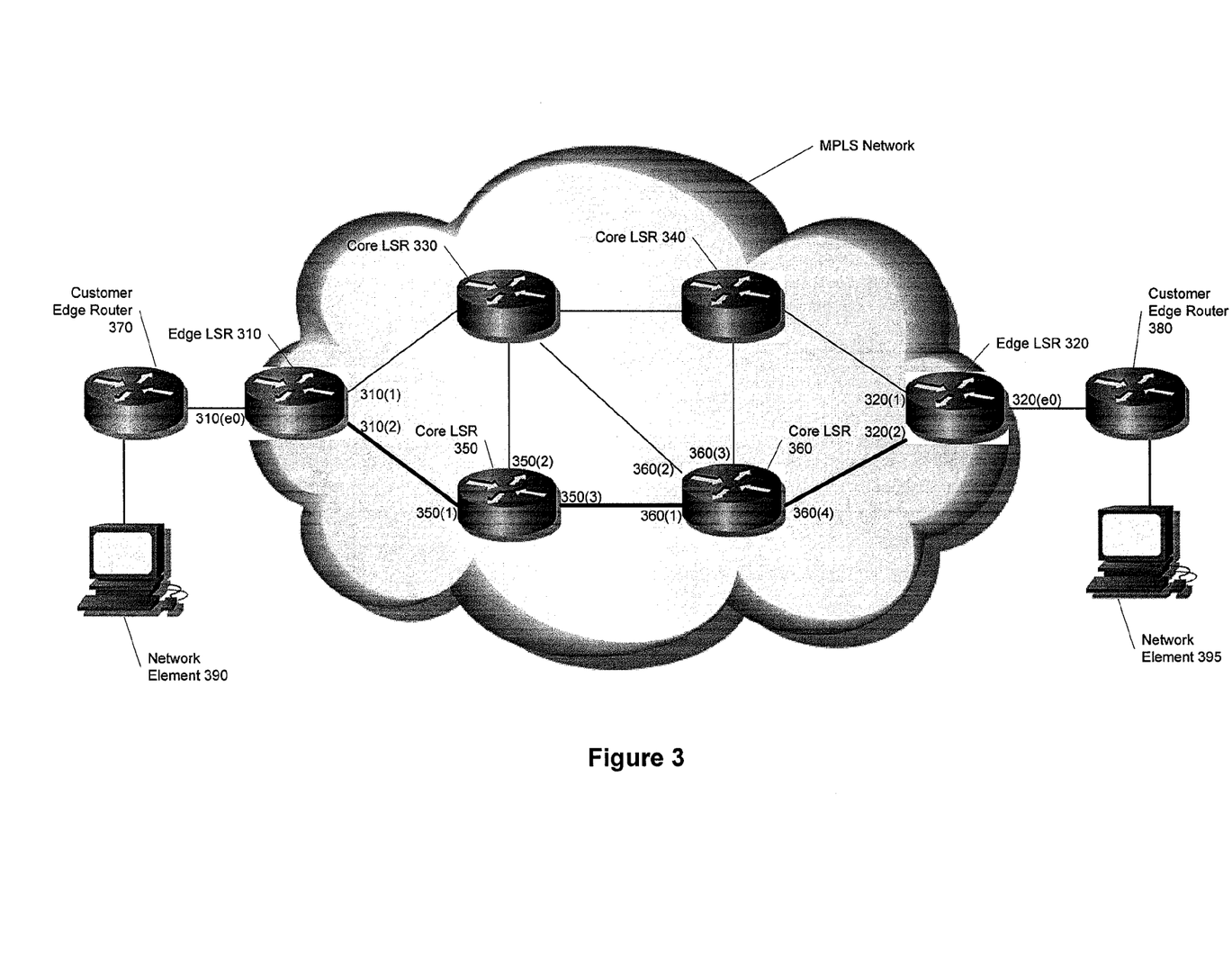
FIG. 3 is a simplified block diagram illustrating a datastream path through an MPLS network.

FIG. 3 is a simplified block diagram illustrating a path a datastream can take through an MPLS network. In FIG. 3, a series of LSRs (edge and core) interconnect, forming a physical path between two network elements, 390 and 395, which are connected to the MPLS network through customer edge routers 370 and 380. An Ethernet frame carrying an IP datagram generated by network element 390 will follow the standard Ethernet format with a normal Layer 2 header followed by a Layer 3 header. Because the destination address resides in a different network, customer edge router 370 forwards a packet including the IP datagram to edge LSR 310. Edge LSR 310 references its internal forwarding table (also known as a forwarding information base (FIB)) and determines that it needs to forward a packet including the IP datagram via interface 310(2) toward edge LSR 20.

The core of the MPLS network includes core LSRs 330, 340, 350, 360, which are coupled, directly or indirectly, to edge LSRs 310 and 320.

The FIB entry for the destination network in ingress edge LSR 310 indicates that edge LSR 310 must include a label with the packet to indicate what path the packet should take on its way to egress edge LSR 320 and from there to destination network element 395. The label can be inserted before the Layer 3 header in the frame passed from edge LSR 310 to the next hop core LSR 350. Core LSR 350 receives the frame at interface 350(1) and determines the presence of the label. Core LSR 350 then treats the packet according to the configuration in its label forwarding information base (LFIB), which directs the core LSR to forward the packet via interface 350(3) and to replace the old incoming label with a new outgoing label. Core LSR 360 will then handle the packet in a similar manner, receiving the packet at interface 360(1) and transmitting the packet via interface 360(4), after having stripped the label added at core LSR 350 and inserting a new label.

Edge LSR 320 is the egress point from the MPLS network for the packet. Edge LSR 320 performs a label lookup in the same way as the previous LSRs, but will have no outgoing label to use. Edge LSR 320 will then strip off all label information and pass a standard packet including the IP datagram to customer edge router 380, which will then transmit the IP frame to network element 395. It should be noted that the LSP between edge LSRs 310 and 320 can take different links than the ones indicated in FIG. 3. The table below illustrates the incoming and outgoing interface and incoming and outgoing label changes that occur at each LSR in the illustrated LSP.

TABLE 1

| Router | Incoming Label | Incoming Interface | Destination Network | Outgoing Interface | Outgoing Label |
|---|---|---|---|---|---|
| 310 | — | 310(e0) | B | 310(2) | 6 |
| 350 | 6 | 350(1) | B | 350(3) | 11 |
| 360 | 11 | 360(1) | B | 360(4) | 7 |
| 320 | 7 | 320(2) | B | 320(e0) | — |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configured to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e.g., Table 1). Labels are "locally significant" because they are replaced at each hop. Whenever an LSR discovers a neighbor LSR, the two LSRs establish a connection to transfer label bindings.

LDP can exchange subnet/label bindings using one of two methods: downstream unsolicited distribution or downstream-on-demand distribution. Downstream unsolicited distribution disperses labels if a downstream LSR needs to establish a new binding with its neighboring upstream LSR. In downstream-on-demand distribution, a downstream LSR sends a binding upstream only if the upstream LSR request it. For each router in an upstream LSR's route table, the upstream LSR identifies the next hop for that route. The upstream LSR then issues a request (via LDP) to the downstream (next hop) LSR for a label binding corresponding to the downstream LSR. When the downstream LSR receives the request, the downstream LSR allocates a label, creates an entry in its LFIB with the incoming label set to the newly allocated label, and then the downstream LSR returns a binding between the newly allocated label and the route to the upstream LSR that sent the original request. When the upstream LSR receives the binding information, the upstream LSR creates an entry in its LFIB and sets the outgoing label in the entry to the value received from the downstream LSR. In a network using downstream-on-demand distribution, this process is repeated recursively until the destination is reached.

When an LSR receives a packet with a label, the LSR uses the label for an index search in the LSR's LFIB. Each entry in the LFIB may consist of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software. A forwarding decision is further independent of the label's forwarding granularity; that is the same forwarding algorithm applies to both unicast and multicast. A unicast LFIB entry will have one outgoing label, outgoing interface and outgoing link level information. A multicast entry can have one or more outgoing labels, outgoing interfaces, and outgoing link-level informations associated with the one label.

Multicast transmission through a MPLS network can result in multiple egress edge LSRs receiving a datastream entering the MPLS network at a single ingress edge LSR. Such a point-to-multipoint label switch path through an MPLS network has a similar form to the multicast tree discussed above, wherein the route of the point-to-multipoint LSP tree is through the ingress edge LSR. But MPLS and LDP do not allow for configuration of a multipoint-to-multipoint label switch path, and therefore bi-directional multicast can only be performed by configuring multiple point-to-multipoint LSPs from each ingress edge LSR coupled to a source to the various egress edge LSRs. Such a process is costly in terms of configuration, time, flexibility, and memory/label space resources on the LSRs within the MPLS network. What is therefore needed is a means for configuring and maintaining a multipoint-to-multipoint LSP tree within a provider network using a protocol such as MPLS.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a means for creating, maintaining, and using multipoint-to-multipoint label switch paths in a provider network using a protocol such as multiprotocol label switching (MPLS). A multipoint-to-multipoint LSP, allowing bi-directional multicast-type transmission between routers in a core provider network, is provided, in part, by configuring routers within the core network to associate not only an upstream data interface with an upstream label, but also each downstream interface with an upstream label in an upstream state.

Figure 4:
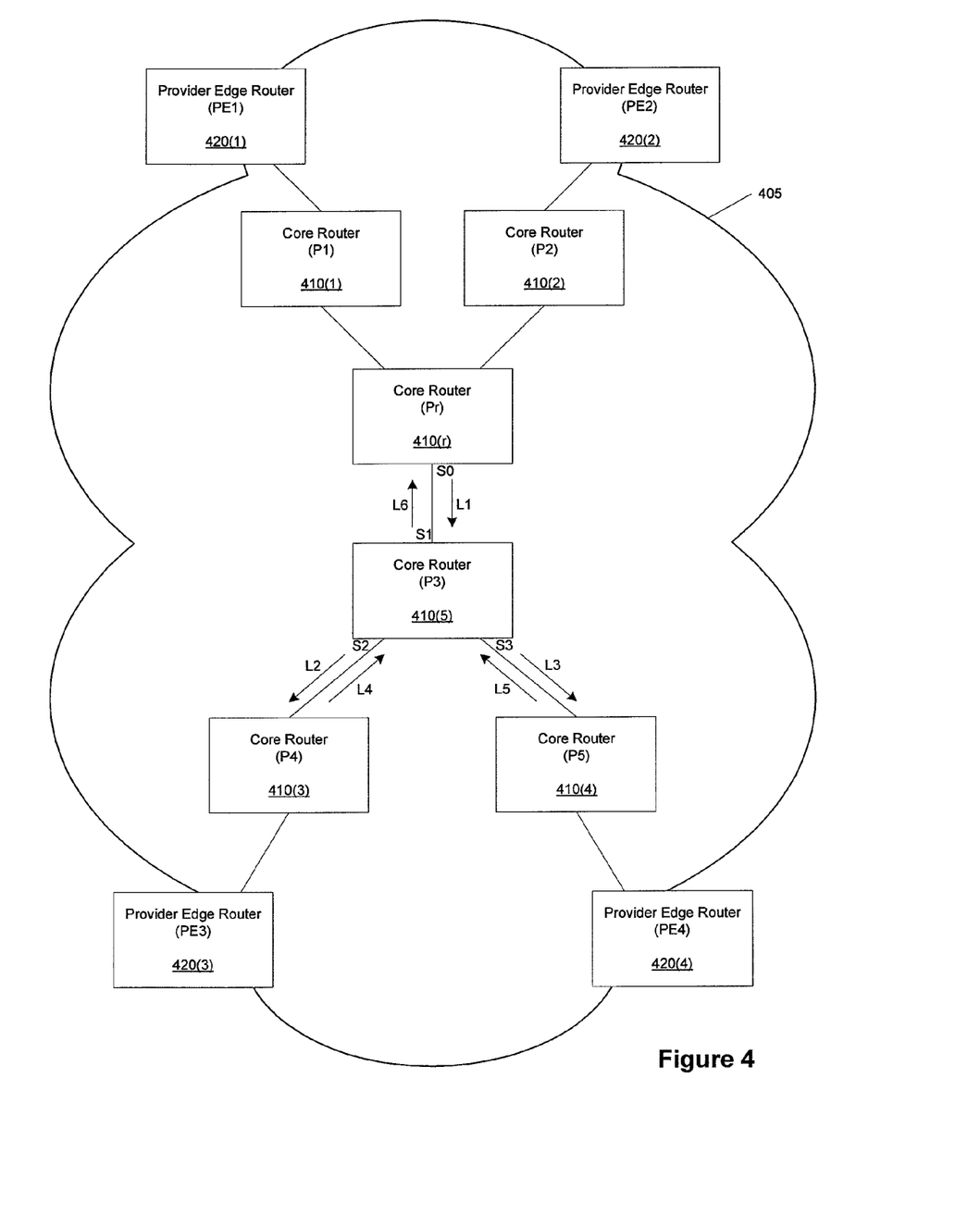
FIG. 4 is a simplified block diagram of network router elements in a provider network in accord with one embodiment of the present invention.

FIG. 4 is a simplified block diagram of network router elements in a provider network in accord with one embodiment of the present invention. Such a provider network can utilize MPLS protocols to improve data transmission speeds within the core network. Provider network 405 includes core network router elements 410(1-5) and 410(r). Provider network 405 further includes edge router elements 420(1-4). The edge router elements can be connected to network elements or external network router elements (not pictured) to allow ingress and egress of datastreams to the provider network. The illustrated core network router elements and edge network router elements are physically coupled to permit the transmission of datastream packets from any edge router element 420(1-4) to any other edge router element. Unlike in a point-to-multipoint LSP, in a multipoint-to-multipoint LSP, datastreams must be able to flow "downstream" from a source to a group of receivers, but also "upstream" from each receiver acting as a source to each other receiver. Similar to bi-directional multicast, in order to permit upstream data flow, a root address must be established within the core network. Each network router will be configured to find a path to the root address. In FIG. 4, core network router element 410(r) corresponds to the root address of the multipoint-to-multipoint LSP tree. From the perspective of each non-source edge network router element and each intermediate core network router element (e.g. 420(4), 410(4), and 410(5)), the root network router element is always considered to be in the upstream direction. Thus, datastream packets transmitted on the multipoint-to-multipoint LSP tree will first be directed to the root network router element and from there will be directed toward the subscriber edge network router elements through the core network.

Different states are created in LSRs to allow forwarding based on labels in label switching: one downstream state and multiple upstream states. The number of upstream states is dependent on the number of downstream interfaces. Normally, the number of upstream states is the same as the number of outgoing interfaces. The following paragraphs, describing features of FIG. 4, illustrate an embodiment of the formation of these upstream states.

In forming an exemplary multipoint-to-multipoint LSP, router 410(3) sends a label mapping to network router element 410(5), and informing network router element 410(5) to use a label L2 for downstream (toward network router element 410(3)) traffic. Network router element 410(4) does the same and provides network router element 410(5) with a label L3 for downstream (toward network router element 410(4)) traffic. Thus, the downstream state for network router element 410(5) is as follows:

TABLE 2

| Incoming | Outgoing |
|---|---|
| L1, S1 | L2, S2 |
|  | L3, S3 |

Table 2 illustrates that packets in an incoming datastream using a label L1 appearing on interface S1 should be replicated and transmitted on interfaces S2 and S3 using labels L2 and L3, respectively.

During the building of a multipoint-to-multipoint LSP tree, an additional LSP per downstream interface is installed for upstream traffic when the downstream LSP is built. Using the label mapping received from network router element 410(3), network router element 410(5) will send 410(3) a upstream label L4 as a reply; that label will be used for upstream traffic sent from network router element 410(3) to 410(5). Likewise, an upstream label L5 will be sent by network router element 410(5) to network router element 410(4) for upstream traffic of the multipoint-to-multipoint LSP tree.

From network router element 410(5) to the root network router element 410(r), similar LSP installation operations can occur. A label mapping including downstream label L1 can be sent from 410(5) to 410(r), and the root network router element can send an upstream label L6 for upstream traffic. The L6 upstream label can be shared between the two upstream states from 410(3) and 410(4), thus permitting both upstream datastreams to go to the same root network router element via the same path. Thus, network router element 410(5) has the following upstream states:

TABLE 3

| Incoming | Outgoing |
|---|---|
| L4, S2 | L6, S1 |

TABLE 4

| Incoming | Outgoing |
|---|---|
| L5, S3 | L6, S1 |

Table 3 illustrates an upstream state wherein a datastream incoming on interface S2 having an upstream label L4 will be directed to interface S1 and will include a label L6. Table 4 similarly shows an incoming datastream with label L5 arriving on interface S3 being directed to interface S1 and with a label L6 inserted.

These upstream states will permit datastream packets to travel upstream from a source to the LSP tree root. However, while forwarding on a multipoint-to-multipoint tree, it is desirable to also send packets down the tree "branches" at intermediate network router elements as datastream packets travel upstream toward the root. For example, datastream packets traveling upstream from network router element 410(3) through network router element 410(5) would not only be transmitted upstream toward root network router element 410(r), but also would be replicated and transmitted to network router element 410(4). Through such intermediate duplication of the upstream datastream, the multipoint-to-multipoint LSP is not dependent on the root to send the packets back downstream through an intermediate network router element that has previously handled that frame from the network datastream. This can be accomplished by merging the downstream state at network router element 410(5) with the upstream states. Each upstream state can copy the interfaces from the downstream state, with the exception of the incoming interface for the upstream traffic. The incoming interface is excluded because there is no need to replicate and transmit the datastream packets back toward the datastream's source. As a result, the upstream states on network router element 410(5) will be as follows:

TABLE 5

| Incoming | Outgoing |
|---|---|
| L4, S2 | L6, S1 |
|  | L3, S3 |

TABLE 6

| Incoming | Outgoing |
| --- | --- |
| L5, S3 | L6, S1 |
|  | L2, S2 |

For example, an incoming datastream packet having a label L4 arriving at interface S2 will be replicated by network router element 410(5) and transmitted from interface S1 with an inserted label L6 (as in Table 3) and transmitted from interface S3 with an inserted label L3 (as in Table 2). Through such a technique of creating specific upstream states in combination with merging the downstream state outgoing interface list, a full-feature multipoint-to-multipoint LSP tree can be built.

Figure 5:
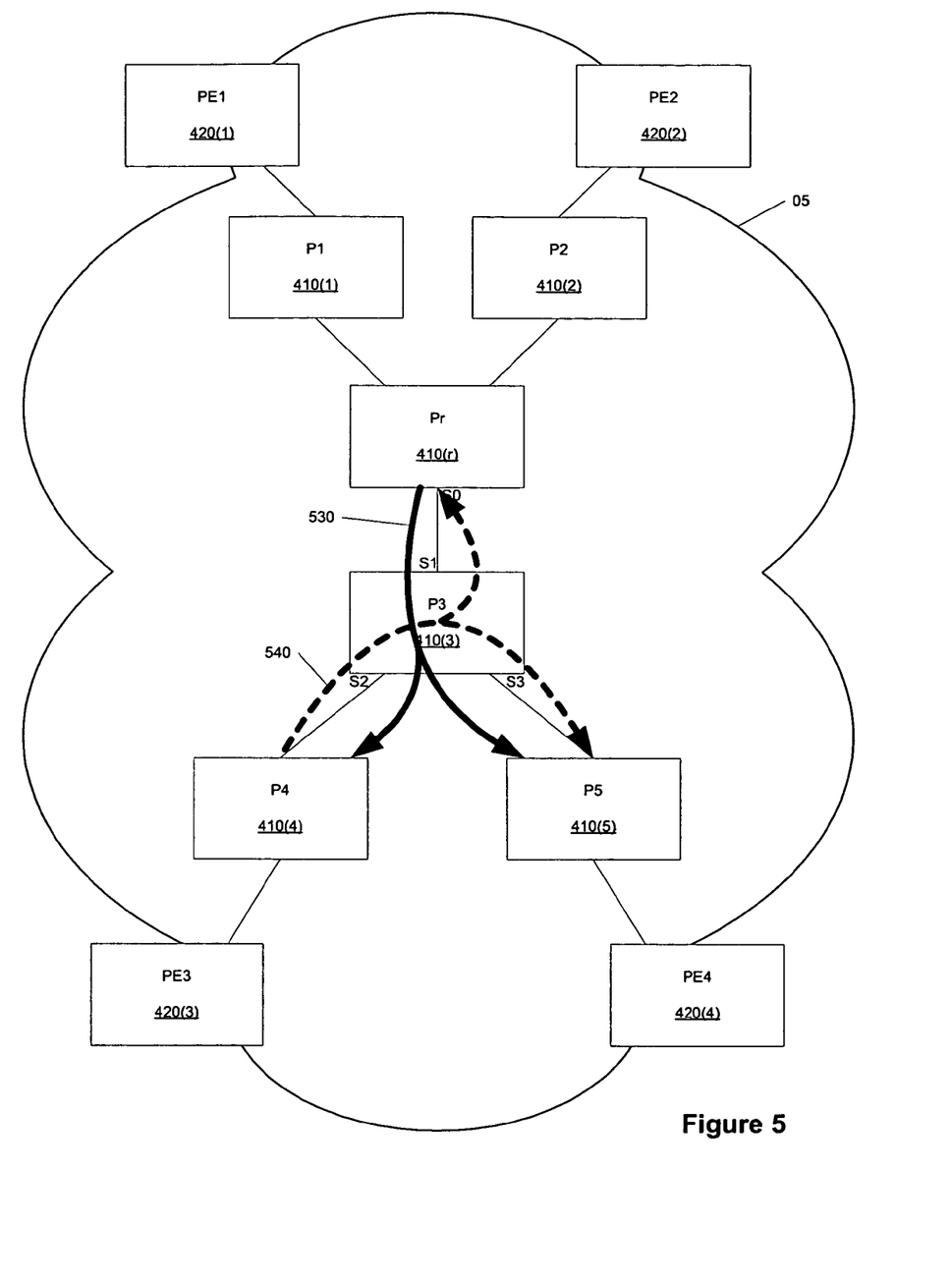
FIG. 5 is a simplified block diagram illustrating an example of datastream replication in accord with one embodiment of the present invention.

FIG. 5 is a simplified block diagram illustrating an example of datastream replication in accord with one embodiment of the present invention. FIG. 5 superimposes a downstream and an upstream datastream upon the core network illustrated in FIG. 4. Downstream datastream 530 is provided to network router element 410(5) by root network router element 410(r). Datastream packets are then replicated and transmitted on interfaces S2 and S3 to network router elements 410(3) and 410(4), respectively. Upstream datastream 540 is transmitted from network router element 410(3) to network router element 410(5), being received on interface S2. Upstream datastream 540 is then replicated and transmitted to root network router element 410(r) and network router element 410(4) on interfaces S1 and S3, respectively. Root network router element 410(r) can then replicate the upstream datastream and transmit frames from the upstream datastream toward edge router elements 420(1) and 420(2) via network router elements 410(1) and 410(2), respectively.

Label distribution protocol (LDP) is used to build label switch paths (LSPs) through an MPLS network. Standard LDP does not provide for the formation of multipoint-to-multipoint LSP trees. Extensions to LDP can be made to provide for multipoint-to-multipoint LSP tree designation. Such information can be provided in a field in LDP packets and interpreted by LSRs within the network. Additionally, capacity to transmit an identifier of the tree that is being formed can be provided.

Figure 6:
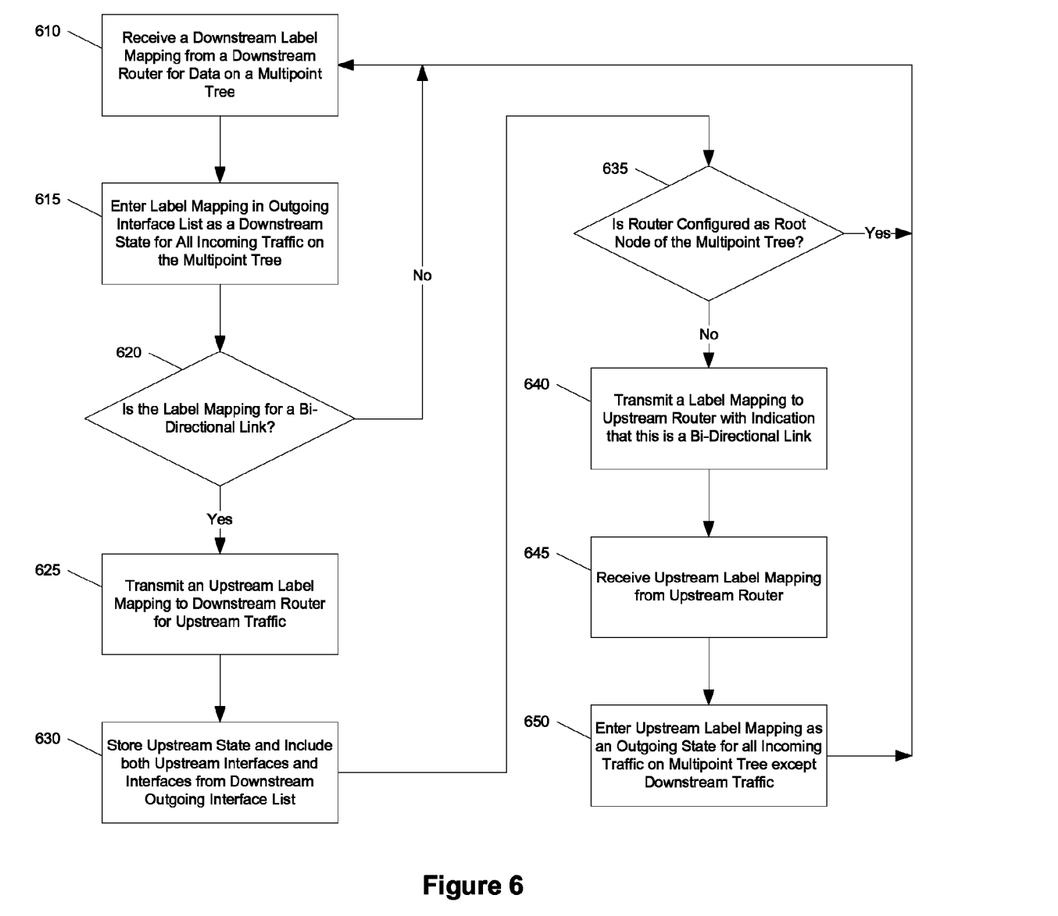
FIG. 6 is a simplified flow diagram of a process performed by a core network router element in accord with one embodiment of the present invention.

FIG. 6 is a simplified flow diagram of a process performed by a core network router element (e.g., network router element 410(5)) in accord with one embodiment of the present invention. The network router element can receive a downstream label mapping from a downstream router for a datastream carried on a multipoint tree (610). The network router element can then enter the downstream label mapping in an outgoing interface list as a downstream state for all incoming traffic on the indicated multipoint tree (615).

It can then be determined from the LDP message whether the label mapping is for a bi-directional link (e.g., a multipoint-to-multipoint LSP tree) (620). If not, then the network router element can return to waiting for other label mappings. If the label mapping is for a bi-directional link, then the network router element can transmit an upstream label mapping for upstream traffic to the downstream router from which it received the downstream label mapping (625). The network router element can then store the upstream state and include both the upstream interface (e.g., S1 on network router element 410(5)) and interfaces from the downstream outgoing interface list (e.g., S3 on network router element 410(5).

If the network router element is not configured as a root of the multipoint tree (635), then the network router element can transmit a label mapping to an upstream network router element (e.g., root network router element 410(r)) along with an indication that such a label is for a bi-directional link (640). The network router element will receive an upstream label mapping from the upstream router (645) and enter that upstream label mapping as an outgoing state for all incoming traffic on the multipoint tree, except for downstream traffic entering through the upstream interface (e.g., interface S1 on network router element 410(5)). In such a manner, both downstream and upstream states described previously are configured.

An Example Router

Figure 7:
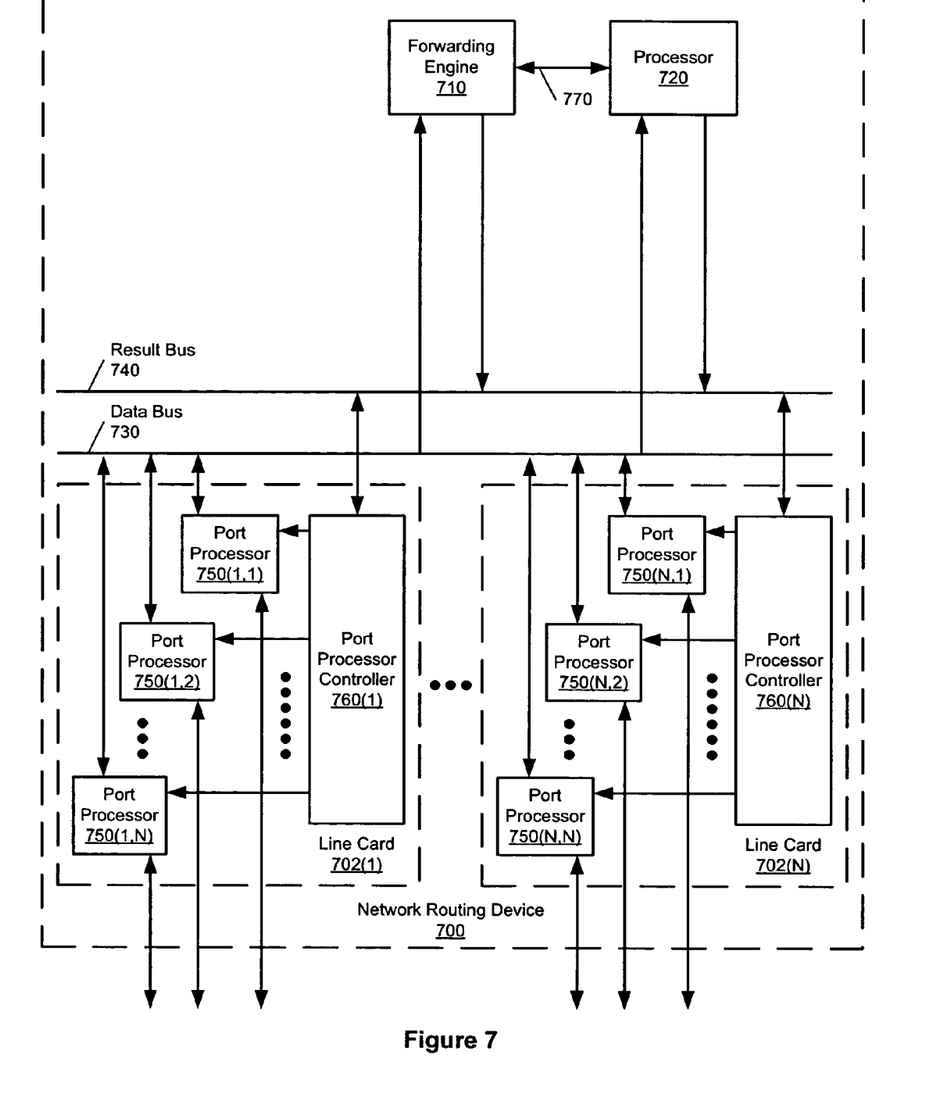
FIG. 7 is a simplified block diagram illustrating a network router element suitable for implementing embodiments of the present invention.

FIG. 7 is a block diagram illustrating a network router element. In this depiction, network router element 700 includes a number of line cards (line cards 702(1)-(N)) that are communicatively coupled to a forwarding engine 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

When a packet is received, the packet is identified and analyzed by a network router element such as network router element 700 in the following manner, according to embodiments of the present invention. Upon receipt, a packet (or some or all of its control information) is sent from the one of port processors 750(1,1)-(N,N) at which the packet was received to one or more of those devices coupled to data bus 730 (e.g., others of port processors 750(1,1)-(N,N), forwarding engine 710 and/or processor 720). Handling of the packet can be determined, for example, by forwarding engine 710. For example, forwarding engine 710 may determine that the packet should be forwarded to one or more of port processors 750(1,1)-(N,N). This can be accomplished by indicating to corresponding one(s) of port processor controllers 760(1)-(N) that the copy of the packet held in the given one(s) of port processors 750(1,1)-(N,N) should be forwarded to the appropriate one of port processors 750(1,1)-(N,N).

In the foregoing process, network security information can be included in a frame sourced by network routing device 700 in a number of ways. For example, forwarding engine 710 can be used to detect the need for the inclusion of network security information in the packet, and processor 720 can be called into service to provide the requisite network security information. This network security information can be included in the packet during the transfer of the packet's contents from one of port processors 750(1,1)-(N,N) to another of port processors 750(1,1)-(N,N), by processor 720 providing the requisite information directly, or via forwarding engine 710, for example. The assembled packet at the receiving one of port processors 750(1,1)-(N,N) can thus be made to contain the requisite network security information.

In addition, or alternatively, once a packet has been identified for processing according to the present invention, forwarding engine 710, processor 720 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of network routing device 700). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method for creating a multipoint-to-multipoint tree, the method comprising:
  storing, by a first network router element, a first upstream forwarding state of a multipoint-to-multipoint tree, wherein
    the first upstream forwarding state comprises a first upstream label and one or more downstream labels,
    the first upstream label is associated with a first interface of the first network router element that is coupled to a downstream network router element,
    the one or more downstream labels are each associated with a respective interface of one or more respective interfaces of the first network router element,
    the one or more respective interfaces do not comprise the first interface,
    each respective interface is coupled to a respective downstream network router element,
    upstream is toward a root network router element of the multipoint-to-multipoint tree,
    downstream is away from the root network router element of the multipoint-to-multipoint tree, and
    the multipoint-to-multipoint tree comprises a single label switched path supporting bidirectional communication on the single label switched path.

2. The method of claim 1 further comprising:
  determining if the first network router element is the root network router element of the multipoint-to-multipoint tree; and
  in response to determining that the first network router element is not the root network router element,
    determining a first downstream label associated with a second interface of the first network router element, wherein
      the second interface is coupled to an upstream network router element, and
      the one or more respective interfaces do not comprise the second interface, and
    transmitting a label request to the upstream network router element.

3. The method of claim 2 further comprising:
  in response to transmitting the label request
    receiving a second upstream label on the second interface of the first network router element, and
    storing the second upstream label associated with the second interface in the first upstream forwarding state.

4. The method of claim 3, further comprising:
receiving, by the first network element, a network packet comprising a first downstream label for the first link from the first downstream network router element via the first interface for use in the multipoint-to-multipoint tree, and
storing, by the first network element, a downstream forwarding state of the multipoint-to-multipoint tree, wherein
the downstream forwarding state comprises the first downstream label associated with the first interface.

5. The method of claim 4, further comprising:
determining whether the network packet comprises an indication that the first link to the first downstream network router element is bi-directional, in response to the receiving the network packet; and
transmitting, by the first network router element, a second network packet comprising the first upstream label to the first downstream network router element, in response to a determination that the network packet comprises the indication.

6. The method of claim 4, wherein
the downstream forwarding state further comprises the one or more downstream labels associated with the one or more respective interfaces, and
each of the one or more downstream labels is received on the one or more respective interfaces, respectively.

7. The method of claim 6, wherein
the downstream forwarding state further comprises a downstream outgoing interface list,
the first interface is identified by a first interface identifier,
the one or more respective interfaces are each identified by one or more respective interface identifiers, respectively,
the downstream outgoing interface list comprises
the first downstream label and first interface identifier, and
the one or more downstream labels and the one or more respective interface identifiers,
the first upstream forwarding state further comprises an upstream incoming interface list and an upstream outgoing interface list,
the first upstream label and the first interface identifier are stored in the upstream incoming interface list, and
the storing the first upstream forwarding state further comprises
merging the downstream outgoing interface list into the upstream outgoing interface list, excluding the first downstream label and the first interface identifier.

8. The method of claim 7, wherein
the downstream forwarding state further comprises a downstream incoming interface list,
the second interface is identified by a second interface identifier,
the downstream incoming interface list comprises
the first downstream label and the second interface identifier, and
the upstream outgoing interface list further comprises
the second upstream label and the second interface identifier.

9. The method of claim 2, wherein the request comprises the first downstream label.

10. The method of claim 1 wherein the root network router element comprises:
a member of the multipoint-to-multipoint tree, wherein
all datastreams transmitted by the root network router element are transmitted downstream.

11. The method of claim 1 further comprising:
performing communication between members of the multipoint-to-multipoint tree using multiprotocol label switching (MPLS).

12. The method of claim 11, wherein
the first network router element is a core router in a MPLS network.

13. A network router element comprising:
a first interface coupled to a first downstream network router element, wherein
downstream is away from a root network element of a multipoint-to-multipoint tree,
upstream is toward the root network element of the multipoint-to-multipoint tree, and
the multipoint-to-multipoint tree comprises a single label switched path supporting bidirectional communication on the label switched path;
one or more respective interfaces, wherein
each respective interface of the one or more respective interfaces is coupled to a respective downstream network router element, and
the one or more respective interfaces do not comprise the first interface; and
one or more processors coupled to the first interface and the one or more respective interfaces, wherein the one or more processors are configured to
store a first upstream forwarding state of the multipoint-to-multipoint tree, wherein
the first upstream forwarding state comprises a first upstream label and one or more downstream labels,
the first upstream label is associated with the first interface, and
each of the one or more downstream labels is associated with a respective interface of the one or more respective interfaces.

14. The network router element of claim 13 wherein the one or more processors are further configured to:
determine if the network router element is the root network router element of the multipoint-to-multipoint tree;
determine a first downstream label associated with a second interface of the network router element, in response to a determination that the network router element is not the root network router element, wherein
the second interface is coupled to an upstream network router element, and
the one or more respective interfaces do not comprise the second interface; and
transmit a label request to the upstream network router element, in response to the determination that the network router element is not the root network router element.

15. The network router element of claim 14 wherein the one or more processors are further configured to:
receive a second upstream label on the second interface of the network router element, in response to transmission of the label request; and
store the second upstream label associated with the second interface in the first upstream forwarding state.

16. The network router element of claim 14, wherein
the first interface, the second interface, and the one or more respective interfaces are configured to transmit datastream packets using multiprotocol label switching (MPLS).

17. An apparatus comprising:
a first interface coupled to a first downstream network router element, wherein downstream is away from a root network element of a multipoint-to-multipoint tree, upstream is toward the root network element of the multipoint-to-multipoint tree, and the multipoint-to-multipoint tree comprises a single label switched path supporting bidirectional communication on the label switched path;

one or more respective interfaces, wherein each respective interface of the one or more respective interfaces is coupled to a respective downstream network router element, and the one or more respective interfaces do not comprise the first interface; and means for storing a first upstream forwarding state of the multipoint-to-multipoint tree, wherein the first upstream forwarding state comprises a first upstream label and one or more downstream labels, the first upstream label is associated with the first interface, and each of the one or more downstream labels is associated with a respective interface of the one or more respective interfaces.

18. The apparatus of claim 17 further comprising:

means for determining if the apparatus is a root network router element of the multipoint-to-multipoint tree;

means for allocating a first downstream label associated with a second link interface of the apparatus, in response to a determination by said means for determining that the apparatus is not the root network router element, wherein the second interface is coupled to an upstream network router element, and the one or more respective interfaces do not comprise the second interface; and means for transmitting a label request to the upstream network router element, in response to the determination by said means for determining that the apparatus is not the root network router element.

19. The apparatus of claim 18 further comprising:

means for receiving a second upstream label on the second interface of the network router element, in response to transmission of the label request; and means for storing the second upstream label associated with the second interface in the first upstream forwarding state.

\* \* \* \* \*